TELEVISION SYSTEM WITH MODIFIED SYNC SIGNALS AND AUXILIARY TIMING INFORMATION

Filed April 12, 1965 3 Sheets-Sheet 1

INVENTOR
PATRICK BASS
BY
Holcombe, Wetherill & Brisebois
ATTORNEYS

INVENTOR
PATRICK BASS
BY
Holcombe, Wetherill & Brisebois
ATTORNEYS

INVENTOR
PATRICK BASS
BY
Holcombe, Wetherill & Brisebois
ATTORNEYS

United States Patent Office 3,485,941

Patented Dec. 23, 1969

3,485,941

TELEVISION SYSTEM WITH MODIFIED SYNC SIGNALS AND AUXILIARY TIMING INFORMATION

Patrick Bass, London, England, assignor to R. & R. Research Limited, London, England, a British company Filed Apr. 12, 1965, Ser. No. 447,398

Int. Cl. H04n *1/44*

U.S. Cl. 178—5.1 8 Claims

ABSTRACT OF THE DISCLOSURE

Television system utilizing "scrambled" video signal in which the true synchronizing signals are at least partially replaced by a modified synchronizing signal having a different timing and nature from that of the true synchronizing signal, but which need not be removed from the reconstituted signal.

This invention relates to television picture signal coders and decoders, and to systems for broadcasting television programs to restricted audiences, in particular to persons who make effective payments for programs they view.

With pay television systems, often known also as "subscription television," it is desirable that those who are not subscribers should view only unintelligible pictures, even if their receivers will tune to the correct wavelength and the other broadcasting constants. Also it is frequently desirable to charge subscribers specific fees for each program they view, so that the subscribers' receiver equipment should produce intelligible pictures only of those specific programs which have been paid for.

The rendering of television signals to be unintelligible to unauthorised viewers involves some form of coding and each subscriber should have some form of decoder, preferably operated by depositing coins or personal actuations of debit counters, so that they are charged as they view.

Coders and decoders are required in other secret or restricted television systems, and the invention is applicable accordingly.

If the coders and decoders involve complicated operations and equipment, not only will the outlay be very great, but the decoded television signals at authorized receivers are liable to have become distorted by the coding and decoding process. If decoders are to be expensive to manufacture, the expense is proportionately all the greater if there are to be a great many authorized receivers or subscribers, since each requires a decoder. Simpler coders and decoders may not provide sufficient security against unauthorized viewers who may find the coded signals, intelligible enough to provide some entertainment, or who may even construct their own decoders. Systems involving the alteration of the picture waveform during the coding process usually require very sophistically engineered decoders to avoid impermissibly high distortion in the reconstituted or unscrambled pictures reproduced by authorized viewers.

An object of the invention is to provide a system of coding and decoding which is relatively simple and yet affords a high degree of security.

A further object of this invention is to provide apparatus for coding television signals sufficiently securely to render unauthorized viewing uneconomic without any or any substantial alteration in the picture waveform component of the television signals.

Another object of the invention is to deliver a coded signal for radiation from an aerial which will cause line synchronizing circuits in conventional television receivers not equipped with special decoders to operate at incorrect instants and therefore reproduce an unintelligible scrambled or jumbled picture.

Yet a further object is to deliver such a coded signal whereby the line synchronizing circuits operate sometimes at incorrect instants and sometimes at correct instants in relation to the picture waveform, so that a jittering or jumping effect frustrates attempts to unauthorizedly reproduce intelligible pictures.

A feature of the invention is the production of a coded television signal having correctly timed synchronizing pulse components which are unrecognisable by convention television receivers, and also having incorrectly timed "decoy" synchronizing pulses which decoy conventional synchronizing circuits into operating or triggering always or sometimes at the wrong instants.

Another feature of the coding equipment according to the invention is that it provides a coded output signal from a conventional television input signal, and decoding equipment, for instance for pay-television subscribers.

Other objects, features and advantages of the invention will appear from the following description of embodiments thereof, taken in conjunction with the accompanying drawings, in which.

Figure 1:
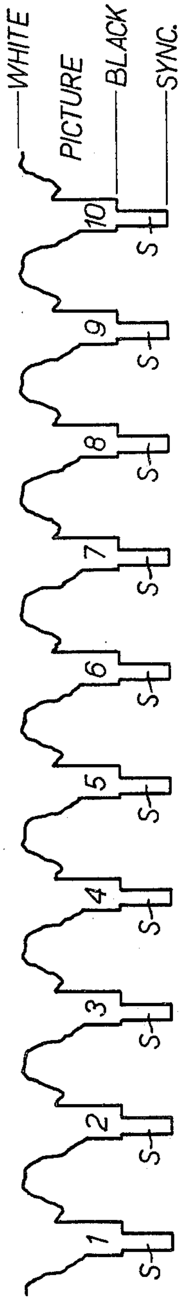
FIGURES 1, 2 and 3 show respectively waveforms of an input conventional television signal, the signal as coded, and the signal after decoding or reconstituting.

The coder and decoder described below have primarily been developed to provide commercial security for a pay television system, without excessively complicated apparatus. This means that the program, at least the vision part, should not have any effective entertainment value when attempts are made to reproduce it on a standard or conventional television receiver. At the same time it is highly desirable that the decoding or unscrambling apparatus should be as simple as possible, and that use can be made by the pay television authority of the subscriber's own television receiver which he uses for other programmes. In this system therefore, each subscriber is supplied with a decoder unit for use with his own conventional television receiver and serving to restore the clarity of the picture as reproduced by his receiver. Depending on the way payments are to be collected, the decoder may also embody a coin box, a credit or debit meter, or automatic billing apparatus.

The coded broadcast signals are ideally such that the cost of the decoders is small, involving their technical simplicity, but it must not be made too easy for a potential pirate to build his own decoder. Also the signal reproduced at unauthorized receivers should be sufficiently scrambled to encourage them to pay a fee, or join the system, whereas the picture reproduced at authorised receivers should be acceptable in quality. Complex coding and decoding of the signal often results in a final reproduction in quite distorted form. The method of scrambling or coding chosen should therefore aim at an acceptable comprise between the cost of the system and the measure of security provided.

In this television restricted broadcast system the picture wave form is left virtually unchanged; that is, scrambling is achieved by sending decoy synchronizing information and by disguising the true synchronising information, so that unauthorized conventional receivers can synchronise at the wrong moments and ignore the correct moments. The picture consequently appears as a jumbled image. Since the picture wave form, in being coded, is only altered at portions corresponding to the image edges, distortion-free decoding is simplified appreciably.

It has been found that, if the synchronising pulses of a composite vision signal are completely removed thus leaving only the picture waveform with its blanking pulses, and the signal is then applied in this modified form to a standard television receiver, it will generally be found possible to obtain a "synchronised" picture by careful adjustment of the horizontal and vertical sweep controls of the receiver. The reason for this is that the synchronisation circuits of the average receiver are able to extract some timing information from the blanking pulses of the picture waveform. The picture obtained will not of course be completely stable; it will tend to slip or roll from time to time, particularly when the scene changes and when there are large areas of black in the picture, but the overall result could be regarded as being of some entertainment value.

This simple experiment demonstrates that removal of the synchronising pulses from the vision signal would not by itself provide an adequate degree of scrambling for a pay television system and that the receiver must additionally be prevented from using the picture blanking pulses for the purpose of synchronisation.

With this end in view, this system, which is described below with reference to the illustrated waveform of FIGURES 1, 2 and 3 and the coding and decoding apparatus of FIGURES 4 and 5, makes use of decoy pulses as signals added in place of the true line synchronising pulses in some but not all line positions, which causes a conventional television receiver to disregard the blanking pulses just as it does in normal operation. These decoy pulses are incorrectly timed in relation to the picture waveform and their width is also varied so as to produce erroneous responses in synchronisation circuits in those conventional receivers which use either triggered circuits or flywheel circuits for synchronisation purposes. As a further safeguard, the timing or width of the blanking pulses is preferably also altered, so not all of these are similar to each other.

Referring to FIGURE 1, there is shown a waveform representing ten consecutive lines of a normal vision signal, consisting of the picture waveform and the associated synchronising pulses; ten lines are drawn merely for convenience in the explanation. The synchronising pulses S are D.C. pulses extending in one direction, in this embodiment the negative direction, of black level, while the picture wave extends positively of black level. FIGURE 2 shows a coded signal waveform, the same ten lines being represented as in FIGURE 1. It is seen that on lines 1, 7 and 8, the genuine synchronising pulses S have been left untouched, while on lines 5, 6 and 10 they have been removed, and on lines 2, 3, 4 and 9 they have not only been removed but also been replaced by decoy pulses D. In each case where a synchronising pulse S was originally present but has been removed, an A.C. coding pulse C has been added in a space provided by marginally extending the blanking period of the picture waveform.

It will be appreciated that extending the blanking period in this manner results in the loss of a small amount of picture information. This ultimately has the effect of reducing the width of the decoded picture by about 5% on the right hand side which can be compensated by a small adjustment of the horizontal amplitude control of the receiver. In all other respects, however, the picture waveform is transmitted in its normal form and is largely unaffected by the coding and decoding processes.

In order to recover the true synchronising information in decoder, the remaining synchronising pulses S and the decoy pulses D, together with the lower halves of the A.C. coding pulses C, are first stripped from the received coded vision signal and applied to a narrow-band filter which separates the A.C. coding pulses from the other pulses. The coding pulses by themselves are then detected and passed through a delay network from which they are applied to control a synchronising pulse regeneration circuit. A synchronising pulse of the correct width and correctly timed in relation to the picture waveform is thus derived from each A.C. coding pulse. These regenerated synchronising pulses are then inserted into the complete coded vision signal as received, by means of a gating circuit, thereby replacing those synchronising pulses which were previously removed and at the same time blanking-out the decoy pulses where they occur.

Figure 3:
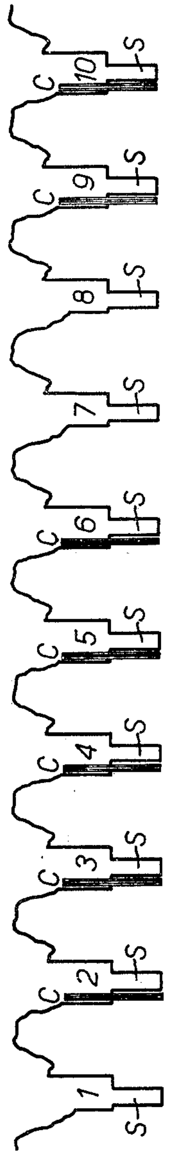

The appearance of the vision signal decoded in this manner is shown in FIGURE 3. It is similar to the normal vision signal except for the presence of the A.C. coding pulses C. These pulses could be removed in the decoder if necessary but there is no point in doing so since, being of a comparatively high frequency, they have no effect upon the synchronisation of the receiver; they are actually presented at the far right of the picture but are hidden from view by the mask of the picture tube.

The precise arrangement of decoy pulses in the coded vision signal is chosen to produce the maximum scrambling effect on receivers with triggered or flywheel synchronising circuits. There are in fact many different arrangements which will produce a satisfactory degree of scrambling on both types of receiver. The scrambled picture appearing is subjected to flickering and jittering due to the effect of the decoy pulses.

The "Decoy Sync" method of scrambling pay television pictures is thus comparatively simple in design and effective in operation. The degree of security provided is considered to be greater than that of any other known method of comparable simplicity and adequate for a commercial operation. A pirate would need to be an engineer capable of assimilating the design technique employed in the decoder and he would require elaborate and costly test equipment; it is unlikely, for example, that the average television service engineer would be successful in building his own decoder. In addition, the pirate would need to know the frequency of the coding pulses and the precise time delay between these pulses and the genuine synchronising pulses, both of which may be varied for each operation. The security of the system could be increased by the application of cryptographic techniques; that is to say, the coding of the vision signal could be varied from programme to programme and the subscriber supplied with a code number for each programme which he would use to adjust his decoder for reception. This would, however, considerably increase the cost of the decoder and would, it is believed, be an unnecessary refinement.

Figure 2:
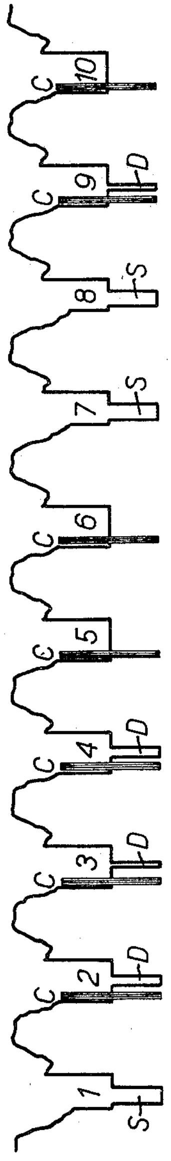
Figure 4:
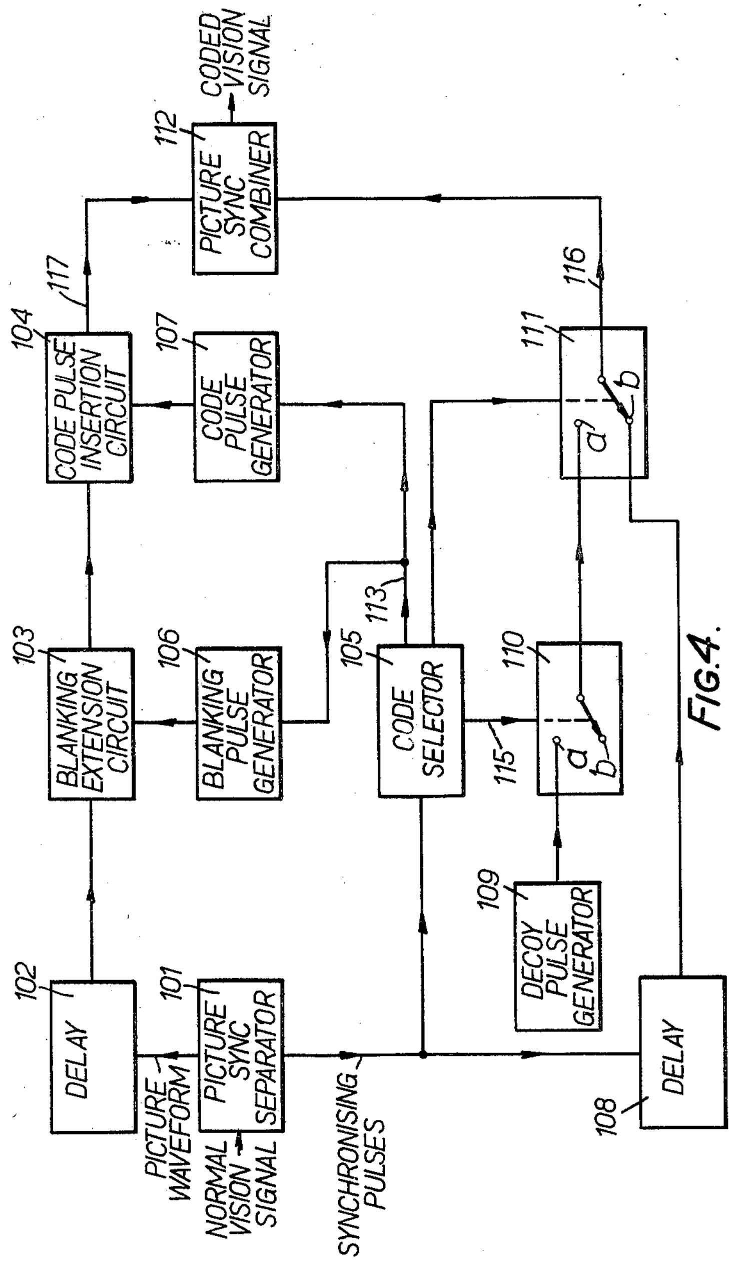
FIGURES 4 and 5 are block schematic diagrams of a coder and a decoder respectively.
Figure 5:
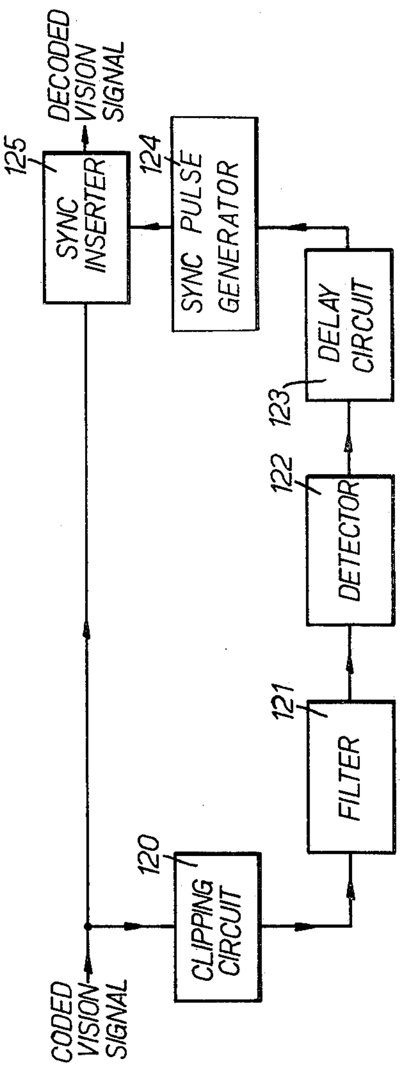

Forms of coding and decoding circuits suitable for use with the system decribed with reference to FIGURES 1, 2 and 3 are shown in FIGURES 4 and 5.

The coder unit shown in FIGURE 10 will generally be located at a transmitter station.

The normal vision signal as shown in FIGURE 1 is applied to a picture/sync separator 101 from which the picture waveform and synchronising pulses S are passed separately to identical delay circuits 102 and 108 respectively. The synchronising pulses are also passed to a code selector 105 which is adjusted to the required coding sequence and accordingly produces trigger pulses to control the various sections of the coding circuits. On output line 113 of the code selector 105 a trigger pulse appears each time it is required to add an A.C. coding pulse C to the vision signal, that is on lines 2, 3, 4, 5, 6, 9 and 10 in the case shown in FIGURE 2. These trigger pulses are applied to a blanking pulse generator 106 and to a code pulse generator 107. The blanking pulse generator 106 produces an extended blanking pulse in response to each applied trigger pulse, and these extended blanking pulses are inserted into the delayed picture waveform by a blanking extension circuit 103, thus providing space during the blanking intervals for the insertion of the A.C. coding pulses which are produced by the code pulse generator 107 and inserted into the delayed picture waveform by a code pulse inserter 104. It will be appreciated by those familiar with the art of television engineering that it is necessary to delay the picture waveform, by delay circuit 102 so that the trigger pulses derived from the synchronising pulses in code selector 105 occur effectively in advance of the normal blanking period of the picture waveform and the A.C. coding pulses C are thus inserted before the normal blanking period starts; in a practical system the time delay introduced would be in the order of four microseconds. The present arrangement has certain advantages particularly that of simplifying the design of the decoding circuits.

The code selector 105 also produces switching pulses which operate two electronic code switches 110 and 111; these switches are shown in FIGURE 4 as mechanically operated switches in order to clarify the operation of the circuit. Referring to FIGURE 2, code switch 110 is in position (a) on lines 2, 3, 4 and 9, and thus decoy pulses D produced by a decoy pulse generator 109 are applied to code switch 111 which is also in position (a) on these lines and thus the decoy pulses appear at the output terminals 116. On lines 5, 6 and 10, code switch 110 is in position (b) while code switch 111 is in position (a), and thus no pulses appear at the output terminals 116. On lines 1, 7 and 8, code switch 111 is in position (b), so that delayed normal synchronising pulses S appear at the output terminals 116. As has already been said, these normal synchronising pulses are delayed by the same period as the picture waveform, and hence they still have the correct time relationship with the waveform.

Thus, at terminals 116 there is a mixture of normal synchronising pulses and decoy pulse with no pulses at all on some lines, while at terminals 117 from inserter 104 there is the picture waveform into which the A.C. coding pulses have been inserted. These two signals are combined in picture/sync combiner 112 to produce the complete coded vision signal as shown in FIGURE 2.

The decoding circuit used at a receiving station is shown in FIGURE 5.

The synchronising pulses S and the decoy pulses D, together with the lower halves of the A.C. coding pulses C are separated from the coded vision signal shown in FIGURE 2, by a clipping circuit 120 of the decoder, and are applied to a filter 121 which in turn separates the A.C. coding pulses C from the other pulses. The coding pulses by themselves are then detected by a detector 122 to produce trigger pulses which are passed through a delay circuit 123 and applied to a sync regenerator 124. The time delay introduced by the delay circuit 123 corresponds to the time spacing between each A.C. coding pulse of the coded vision signal and the start of the corresponding normal synchronising pulse before it was removed inthe coding process. Sync regeneration circuit 124 thus reproduces a normal synchronising pulse from each A.C. coding pulse C. The synchronising pulses are inserted into the complete coded vision signal by a sync inserter 125, thus replacing those synchronising pulses which were previously removed and, in replacing them blanking out the decoy pulse where they occur.

In FIGURE 3, some of the D.C. pulses S originate from the incident signal shown in FIGURE 1, which pass unchanged through the coding and decoding processes, while the others are inserted by unit 125 in response to A.C. pulses C.

In the coded signal of FIGURE 2, the purpose of the decoy pulses is to carry only misleading or incorrect synchronising information and these therefore contribute nothing to the decoding process.

Variations will occur to those skilled in the art without departing from the scope of the appended claims.

I claim:

1. Video signal transmitter means comprising, in combination: a source of video signals having spaced picture signal components representing an image, blanking signals of predetermined duration separating said picture signal components and synchronizing signals of predetermined nature and having a first predetermined timing with respect to said picture signal components; said synchronizing signals occurring during said blanking signals; signal altering means for replacing selected ones of said blanking signals and synchronizing signals by extended blanking signals and modified synchronizing signals, said extended blanking signals having a portion extending beyond said predetermined duration and said modified synchronizing signals having a nature different from said predetermined nature and having a second predetermined timing with respect to said picture signal components, said second timing being such that said modified synchronizing signals occur during said extended portions of said extended blanking signals, and decoy signal insertion means for adding decoy signals to further selected ones of said extended blanking signals.

2. Video signal transmitter means as claimed in claim 1, wherein said picture signal components occupy a first predetermined amplitude range and said synchronizing signals occupy a second predetermined amplitude range distinct from said first range, said synchronizing signals comprising pulses of predetermined duration; wherein said decoy signals comprise decoy pulses in said second amplitude range, said decoy pulses having durations less than said predetermined duration and having timings such that each said decoy signal occurs wholly within the duration of a said replaced synchronizing signal.

3. Video signal transmitter means as claimed in claim 2, wherein said modified synchronizing signals comprise bursts of sinusoidal voltage having said second predetermined timing, said voltage bursts extending both into said first amplitude range and into said second amplitude range.

4. A television system, comprising in combination: transmitter means including a source of video signals having spaced picture signal components representing an image; blanking signals of predetermined duration separating said picture signal components and synchronizing signals of predetermined nature having a first predetermined timing with respect to said picture signal components, said synchronizing signals occurring during said blanking signals; signal altering means for replacing selected ones of said blanking signals and synchronizing signals by an extended blanking signal having an extended portion containing a modified synchronizing signal, said modified synchronizing signal having a nature different from said predetermined nature and having a second predetermined timing with respect to said picture signal components, said second timing being different from said first timing; decoy signal insertion means for inserting in further selected ones of said extended blanking signals decoy signals having said predetermined nature and having timings differing from said first and said second timings, thereby to develop a modified video signal; means for transmitting said modified video signal to each of a plurality of receiving positions; apparatus at a said receiving position including a picture reproducing device operable by picture signals and synchronizing signals to reproduce said image; means for deriving a picture signal from said modified video signal; means for applying said picture signal to said reproducing device; synchronizing signal reconstituting means insensitive to said decoy signals and responsive to said modified synchronizing signals to derive therefrom reconstituted synchronizing signals having said predetermined nature and timing; and means for applying said reconstituted synchronizing signals to control the operation of said picture reproducing device.

5. A television system as claimed in claim 4, wherein said picture signal components occupy a first predetermined amplitude range and said synchronizing signals occupy a second predetermined amplitude range distinct from said first range, said synchronizing signals comprising pulses of predetermined duration; wherein said decoy signals comprise decoy pulses in said second amplitude range, said decoy pulses having durations less than said predetermined duration and having timings such that each said decoy signal occurs wholly within the duration of a said replaced synchronizing signal.

6. A television system as claimed in claim 5, wherein said modified synchronizing signals comprise bursts of sinusoidal voltage having said second predetermined timing, said voltage bursts extending both into said first amplitude range and into said second amplitude range.

7. Television receiver apparatus, comprising in combination; means for receiving modified video signal including spaced picture signal components representing an image, blanking signals and extended blanking signals separating said picture signal components, said blanking signals being of predetermined duration and having therein synchronizing signals having a predetermined nature and having a first predetermined timing with respect to said picture signal components, and said extended blanking signals having an extended portion whereby said extended blanking signals have an extended duration greater than said predetermined duration, said extended blanking signal portions including modified synchronizing signals, said modified synchronizing signals having a nature different from said predetermined nature and having a second predetermined timing with respect to said picture signal components, said second timing being different than said first timing and decoy signals having the nature of said synchronizing signals and having timings differing from said first timing; picture signal reproducing means responsive to video signals including spaced picture signal components, blanking signals separating said picture signal components and synchronizing signals having said predetermined nature and timing; synchronizing signal regenerator means responsive to said modified video signal to develop from said modified synchronizing signals regenerated synchronizing signals having said predetermined nature and timing, said regenerator means being insensitive to said decoy signals; and signal combining means responsive to said modified video signal and to said regenerated synchronizing signals to yield a composite video signal including said picture signal components, said blanking signals and extended blanking signals, said modified synchronizing signals, said synchronizing signals and said regenerated synchronizing signals; and means applying said composite signal to control said picture signal reproducing means.

8. Television receiver apparatus as claimed in claim 7, wherein said modified synchronizing signals comprise bursts of sinusoidal voltage of predetermined frequency and wherein said synchronizing signal regenerator means includes separator means responsive to said modified video signal to separate said picture signal components therefrom thereby to yield separated synchronizing signals containing synchronizing signals, decoy signals and modified synchronizing signals; filter means preferentially responsive to components of said predetermined frequency contained in said separated synchronizing signals to yield sinusoidal voltage bursts having said second predetermined timing; detector means responsive to said voltage bursts to develop advance synchronizing signals having said predetermined nature and having said second timing; and signal delay means responsive to said advance synchronizing signals to yield said regenerated synchronizing signals having said predetermined nature and having said first predetermined timing.

References Cited

UNITED STATES PATENTS 3,081,376 3/1963 Loughlin ............ 178—5.1
3,313,880 4/1967 Bass ................ 178—5.1

ROBERT L. GRIFFIN, Primary Examiner

H. W. BRITTON, Assistant Examiner